(12) United States Patent
Wanpen (10) Patent No.: US 12,101,313 B2
(45) Date of Patent: Sep. 24, 2024

(54) MULTI-PLATFORM AUTHENTICATION

(71) Applicant: Bank of America Corporation, Charlotte, NC (US)

(72) Inventor: Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 294 days.

(21) Appl. No.: 17/738,117

(22) Filed: May 6, 2022

(65) Prior Publication Data

US 2023/0362153 A1 Nov. 9, 2023

(51) Int. Cl.
*H04L 9/40* (2022.01)
*H04L 67/146* (2022.01)

(52) U.S. Cl.
CPC .......... *H04L 63/083* (2013.01); *H04L 63/105* (2013.01); *H04L 67/146* (2013.01)

(58) Field of Classification Search
CPC . H04L 63/1433; H04L 63/08; H04L 63/0876; H04L 63/20; H04L 63/083; H04L 63/10; H04L 9/3263; H04L 63/0428; H04L 63/0823; H04L 63/123; H04L 67/131; H04L 63/102; H04L 9/3247; H04L 63/166; H04L 67/52; H04L 63/0807; H04L 63/105; H04L 63/107; H04L 65/1023; H04L 63/0209; H04L 63/0272; H04L 63/0281; H04L 63/0815; H04L 63/108; H04L 63/1408; H04L 43/0882; H04L 61/5007; H04L 63/0884; H04L 63/12; H04L 63/1441; H04L 63/0853; H04L 9/3213; H04L 9/0866; H04L 9/3231; H04L 63/0861; H04L 63/061; H04L 9/3239;
(Continued)

(56) References Cited

U.S. PATENT DOCUMENTS 9,594,911 B1 * 3/2017 Khitrenovich ........ G06F 21/577
11,356,436 B2 * 6/2022 Murao .................... G06F 9/451
(Continued)

OTHER PUBLICATIONS

"OAuth: How Does 'Login with Facebook/Google' Work," https://www.scienceabc.com/innovation/oauth-how-does-login-with-facebook-google-work.html, Science ABC, Jan. 10, 2022.
(Continued)

*Primary Examiner* — Djenane M Bayard
(74) *Attorney, Agent, or Firm* — Weiss & Arons LLP (57) ABSTRACT

Apparatus and methods for automatically authenticating a user at a second website after authenticating the user at a first website is provided. The authentication system may include a validation engine running on a first website for validating user login credentials received at the first website. The authentication system may include a web beacon triggered by the second website in response to the validating that, when triggered, scans each website accessed by the user to determine if the website is a login page. The authentication system may also include a password generation application that determines if a URL accessed by the user is included in a permission ledger and, in response to a determination that the permission ledger includes the URL, executes steps to authenticate the password generation application and the user to the second website.

11 Claims, 5 Drawing Sheets

(58) Field of Classification Search
CPC ....... H04L 9/50; H04L 9/0637; H04L 9/0894; H04L 9/30; H04L 9/3228; H04L 63/0838; H04L 63/068; H04L 63/0263; H04L 63/02; H04L 63/0869
See application file for complete search history.

(56) References Cited

U.S. PATENT DOCUMENTS

| | | | |
|---|---|---|---|
| 2017/0221288 A1* | 8/2017 | Johnson | G06Q 20/045 |
| 2021/0306369 A1* | 9/2021 | Pastore | G06F 21/31 |
| 2022/0116390 A1* | 4/2022 | Jass | H04W 12/06 |

OTHER PUBLICATIONS

"Use Your Google Account to Sign in to Other Apps or Services," https://support.google.com/accounts/answer/112802?hl=en&co=GENIE.Platform%3DAndroid, Google, Retrieved on Apr. 6, 2022.

* cited by examiner

MULTI-PLATFORM AUTHENTICATION

FIELD OF TECHNOLOGY

Aspects of the disclosure relate to user authentication. In particular, aspects of the disclosure relate to automatically authenticating a user at a second website after the user has been authenticated to a first website.

BACKGROUND

Websites supporting mobile applications are an ever-present part of our connected lives. Available websites currently provide a wide variety of functions and services from controlling features in a car, music streaming, management of finances, planning of travel, fitness regimes and facilitating social media interactions.

The number of smartphone users is expected to reach 4.3 billion by 2023. This increased smartphone usage is expected to lead to concomitant increase in the number of websites needed to service mobile device users. This expected proliferation of websites has exacerbated the problem of password control and fatigue.

Many webpages require a username and password to protect user data that may be accessible and entered using the webpage. For example, mobile banking has propelled progressive growth of apps providing financial services. Websites providing access to financial information must be secured against unauthorized access.

A user frequently has to remember multiple complex passwords. Using the same login credentials for multiple websites increases the likelihood that if the credentials of one website are compromised, a malicious actor may obtain access to numerous other websites that use the same credentials. Accordingly, there is a need to reduce the number of passwords and yet maintain adequate security of websites using MULTI-PLATFORM AUTHENTICATION.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for multi-platform authentication is provided. The apparatus and methods may include a first website, a web beacon, and a password generation application. Each of the first website, web beacon and the password generation application may be run on a server. The server may run on cloud. A single entity, such as a business, may run the apparatus.

The apparatus and methods of the invention may include methods for automatically authenticating a user at a second website after authenticating the user at the first website. The first website may be any suitable website, such as a banking application, a financial application, a retail application, or any other suitable application.

The methods may include receiving user login credentials at the first website. The user login credentials may identify a user of the first website. The methods may include validating the user login credentials. A validation engine running on the first website may perform the validating of the user login credentials. When the user has been validated, the methods may include granting the user access to the first website.

After the validating, the methods may include triggering a web beacon to scan each website accessed by the user to determine if the website is a login page. A processor running on the cloud-based server supporting the first website may trigger the web beacon after the validating. The triggering of the web beacon may be automatic. The triggering of the web beacon may alternately be performed only after receipt of instructions from the user on the first website to trigger the web beacon. For example, the first website may display an option to the user to trigger the web beacon for automatically logging the user into other websites. Selection by the user of the displayed option may trigger the web beacon to perform actions described below.

The web beacon may use any suitable methods to determine if the website is a login page. In some embodiments, the web beacon may use a machine learning algorithm trained with multiple images of login pages to determine if the website is a login page. In some embodiments, the web beacon may run one or both of an optical character recognition ("OCR") application and an image recognition application to determine if the website is a login page.

In exemplary embodiments, the OCR application may search each website to identify predetermined text including the words 'username' and 'password.' The image recognition application may search each website to identify input fields positioned proximal to the predetermined text. The image recognition application may be triggered to search for input fields after the OCR application identifies the predetermined text.

The web beacon may identify the second website as being a login page. The methods may include the web beacon transmitting a URL of the second website to a password generation application. The web beacon may transmit the URL after determining that the second website accessed by the user is a login page.

In some embodiments, prior to the transmitting of the URL to the password generation application, the web beacon may generate a pop-up box asking the user if he wants to log into the second website. The pop-up box may include a first selectable option that, when selected, triggers the web beacon to transmit the URL to the password generation application. The pop-up box may include a second selectable option that, when selected, prompts the web beacon to take no further action.

In some embodiments, the web beacon may not require a user instruction prior to transmitting the URL of the second website to the password generation application.

The methods may include the password generation application determining if the URL is included in a permission ledger. In response to a determination that the permission ledger does not include the URL, the password generation application may take no action.

The permission ledger may associate each URL with one or more users. Each user associated with a URL may be a user for whom the password generation application and/or the first website stores a username and password to authenticate the user to a login page included in a webpage identified by the URL. In some embodiments, each URL may be associated with a user by being associated with user data. The user data may be a user identification number, a username, or any other information that is stored in a user profile in one or both of the first website and/or the password generation application. The user data may also be extracted from the first website by the web beacon after the web beacon is triggered, stored by the web beacon while it is monitoring the user's webpage activity, and transmitted by the web beacon to the password generation application together with the URL when a website including login fields is identified.

In embodiments where the first website stores the username and password, the user may select from a drop-down box each website for which he has a stored username and password. The first website may include a drop-down list of all URLs with log in pages that are programmed to recognize the password generation application's username and password. The user may select each URL from the drop-down list for which the user already has an account.

In some embodiments, the user may then input his current username and password into the first website for each URL. Each website may be associated with a URL stored in the permission ledger. In some embodiments, the first website may then store the user's usernames and passwords. In some embodiments, the first website may transfer the data to the password generation application, which may store the data in the permission ledger.

In some embodiments, the permission ledger may store, together with the user data associated with a URL, a pointer identifying a location at the first website where the user's login data for that URL is stored. In other embodiments, an API request may be used by the password generation application to request a user's URL login data from the first website. The password generation application may use this data to auto-insert the user's passwords into a login page displayed on a URL, saving the user time and effort, as described below.

After a determination that the permission ledger includes the URL, the password generation application may determine whether the URL is associated with the user. This determination may include the permission ledger retrieving the user data received from the web beacon and searching data associated with the URL for the user data. In response to a determination that the URL stored in the permission ledger is not associated with the user data, the password generation application may take no action.

In response to a determination that the permission ledger includes the URL, and, in some embodiments, that the URL is associated with the user, the password generation application may execute one or more steps to authenticate the password generation application to the second website. The password generation application may electronically access the webpage including the URL that is displayed on an electronic device of the user. The password generation application may then execute a first step of inputting a first username into a first username input field and a first password into a first password input field. The first username input field and the first password input field may be displayed on the second website. The first username input field and the first password input field may be identified by the web beacon. The password generation application may identify username and password fields leveraging systems and methods used by the web beacon to identify login input fields described above.

The first username and the first password may authenticate the password generation application to the second website. The first username and the first password may be stored by the password generation application and may be used by the password generation application to authenticate the password generation application to a plurality of websites.

The second website may store the first username and the first password in an encrypted password database. The second website, upon receipt of the first username and the first password, may display a second username input field and a second password input field to enable the password generation application to authenticate the user.

In response to the second website displaying the second username input field and the second password input field, the methods may include the password generation application executing a second step to authenticate the user to the second website. The second step may include inputting a second username into the second username input field and a second password into the second password input field. The second username and the second password may identify the user to the second website.

The second username and the second password may have been previously input by the user into the first website and subsequently stored on the first website. The second username and the second password may be stored in a database accessible by the first website, and may be obtained by the password generation application by an API request transmitted from the password generation application to the first website.

The second username and the second password may also be stored on the second web site. The second web site, upon receipt of the second username and the second password, may authenticate the user to the second website and, in some embodiments, retrieve a profile of the user stored on the second website.

The methods may include deactivating the web beacon in response to receiving a logout instruction from the user on the first website. As such, the web beacon may only work while the user is logged into the first website. When the first website is a highly secure application, such as a banking application, this may enable second websites to benefit from the first website's secure login procedures and to quickly authenticate the user to their second websites as long as the user is logged into the first website. For example, a second website that typically uses a two-step user authentication process, such as requiring a one-time pin after the user inputs a username and password, may waive the one-time pin requirement and instead allow the password generation application to log in the user using the second passwords only. The waiving of the two-layer authentication may be based on the first website's current authentication of the user to the first website.

The apparatus and methods of the invention may include an authentication system for authenticating a user to a second web site after authenticating the user to a first web site. The authentication system may include some or all of the first website, the validation engine, the web beacon, the password generation application and/or the second website. Each of the first website, the validation engine, the web beacon, the password generation application and/or the second website included in the authentication system may perform one or more functions described herein.

The authentication system may include the validation engine. The validation engine may run on the first website.

The validation engine may validate user login credentials received at the first website and grant the user access to the first website.

The authentication system may include the web beacon. The web beacon may be controlled by an application running on the first website. The web beacon, when activated by the application, may scan each web site accessed by the user to determine if the web site is a login page. In response to determining that a second website accessed by the user is a login page, the web beacon may transmit a URL of the second web site and, in some embodiments, user data, to a password generation application.

The authentication system may include the password generation application. The password generation application may determine if the URL is included in a permission ledger. The password generation application may also determine if the user data is associated with the URL. In response to a determination that the permission ledger does not include the URL, and/or, in some embodiments, that the user data is not associated with the URL, the password generation application may take no action. In response to a determination that the permission ledger includes the URL, and, in some embodiments, that the user data is associated with the URL, the password generation application may executes the first step to authenticate the password generation application to the second website. The first step may include inputting a first username into a first username input field and a first password into a first password input field. The first username input field and the first password input field may be displayed on the second website.

In response to the second website displaying a second username input field and a second password input field, the password generation application may execute a second step to authenticate the user to the second website. The second step may include inputting a second username into the second username input field and a second password into the second password input field.

In some embodiments, after executing the first step, the password generation application may receive an API request from the second website. In response to the receipt of the API request, the password generation application may execute a second step to authenticate the user to the second website. The second step may include transmitting a second username and a second password to the second website. The second username and the second password may be transmitted via an API request. The second website may use the received second username and second password to authenticate the user to the second website.

The application running on the first website may deactivate the web beacon in response to the first website receiving a logout instruction from the user.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

Figure 1:
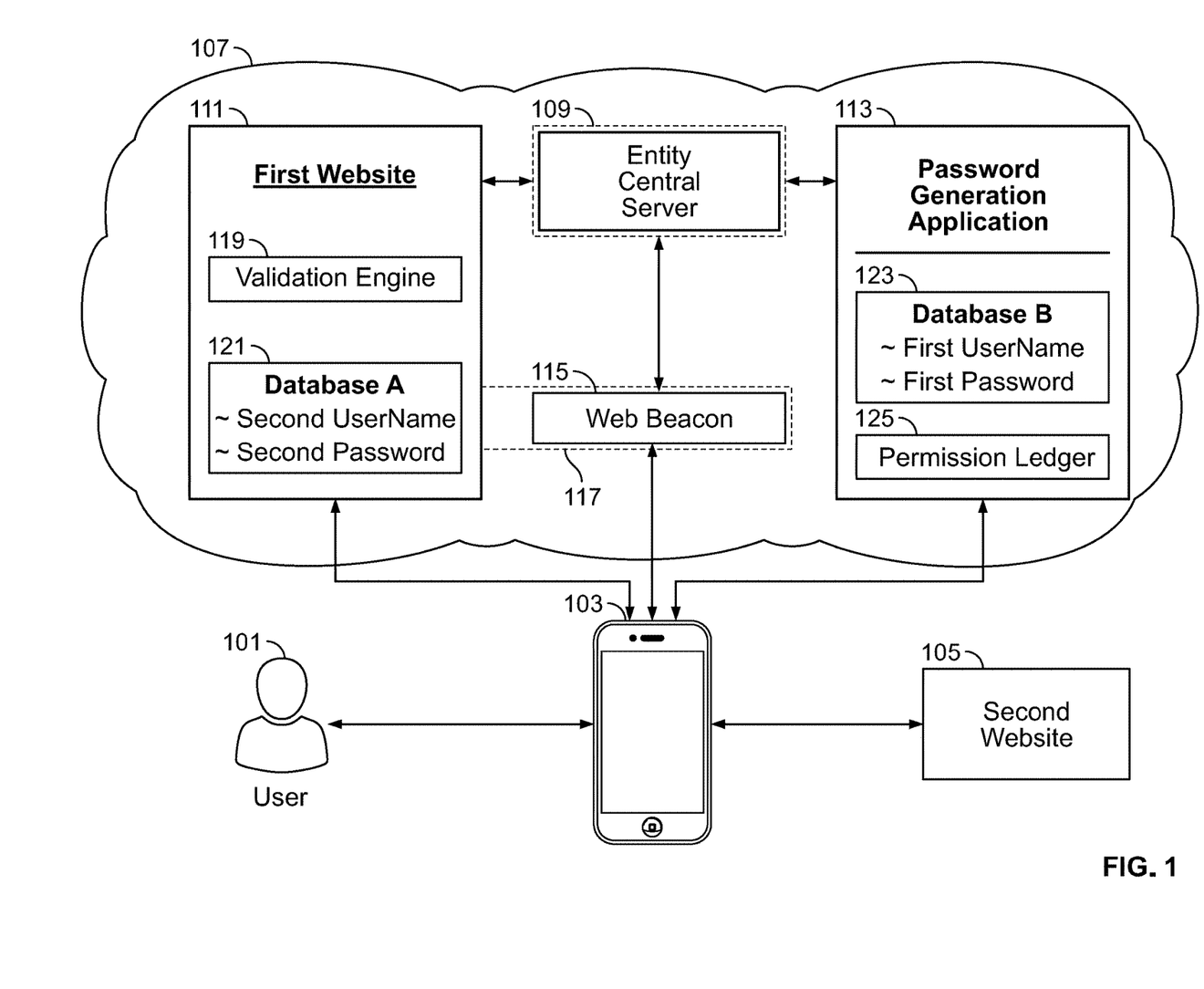
FIG. 1 shows illustrative apparatus and methods in accordance with the invention.

FIG. 1 shows exemplary apparatus and methods in accordance with the disclosure. In FIG. 1, user 101 is shown using computing device 103. Computing device 103 may be any suitable computing device, such as a smart phone, computer, tablet, laptop, smartwatch, or any other suitable electronic device. Computing device 103 may access, via the internet, one or more of first website 111 and second website 105. In response to user 101 logging into first website 111 via computing device 103, web beacon 115 may run on computing device 103, tracking each website user 101 visits while user 101 is logged into first website 111. When user 101 visits second website 105, while concurrently being logged into first website 111, web beacon 115 may trigger password generation application 113 to log user 101 into second website 105 using systems and methods described herein.

An entity central server 109 may run on a cloud-based processor supporting the apparatus displayed within cloud computing resources 107. Entity central server 109 may be in electronic communication with one or more of first website 111, web beacon 115, and/or password generation application 113. Entity central server 109 may deploy, run and/or modify each of the aforementioned applications.

First website 111 may be run by one or more processors and may include validation engine 119 and database 121. Password generation application 113 may be run by one or more processors and may include database 123 and permission ledger 125. Database 121 may store user login and password information. Database 123 may store URLs, user data associated with each URL, and, in some embodiments, usernames and passwords. Permission Ledger 125 may include database 123.

Figure 2:
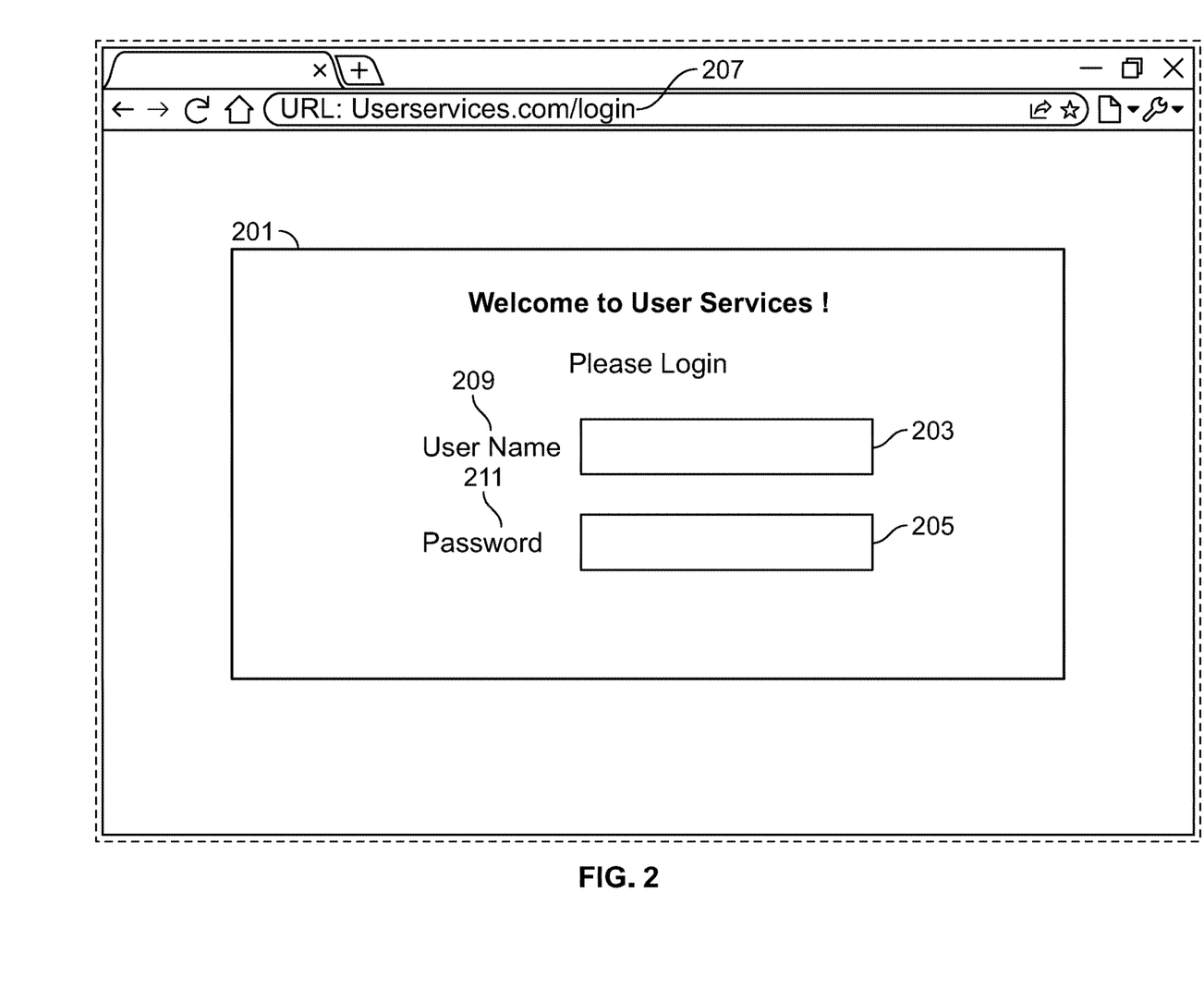
FIG. 2 shows a first illustrative website in accordance with the invention.

FIG. 2 shows exemplary second website 201. In second website 201, username input field 203 and password input field 305 are displayed, adjacent text username 209 and text password 211. Text 209 and 211 may be identified by the OCR application. Input fields 203 and 205 may be identified by the image recognition application as input fields adjacent the aforementioned text. As such, the web beacon may transmit URL 207 to the password generation application described herein.

Figure 3:
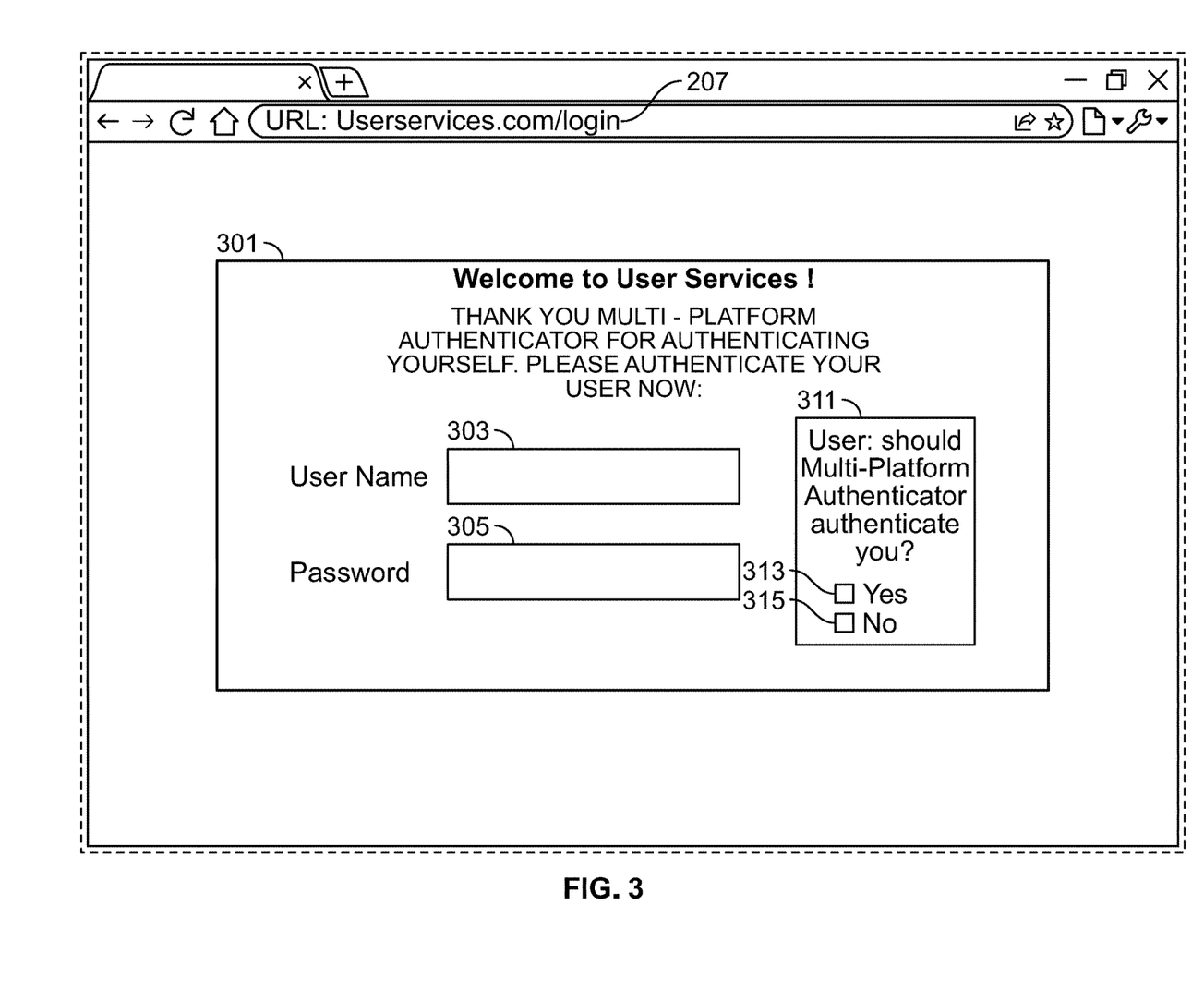
FIG. 3 shows a second illustrative website in accordance with the invention.

FIG. 3 shows exemplary second website 201 displaying second username input field 303 and second password input field 305. In some embodiments, second website 201 may disable input fields 303 and 305 from being able to receive any input data until a user selects selectable icon 313, indicating the user's desire to have the password generation application log into second website 201 on his behalf In response to a selection of selectable icon 313, second website 201 may enable input fields 303 and 305 to receive data, specifically data from the password generation application. In response to a selection of selectable icon 315, indicating that the user does not want the password generation application to log into second website 201, second website 201 may maintain input fields 303 and 305 in a disabled state.

Figure 4:
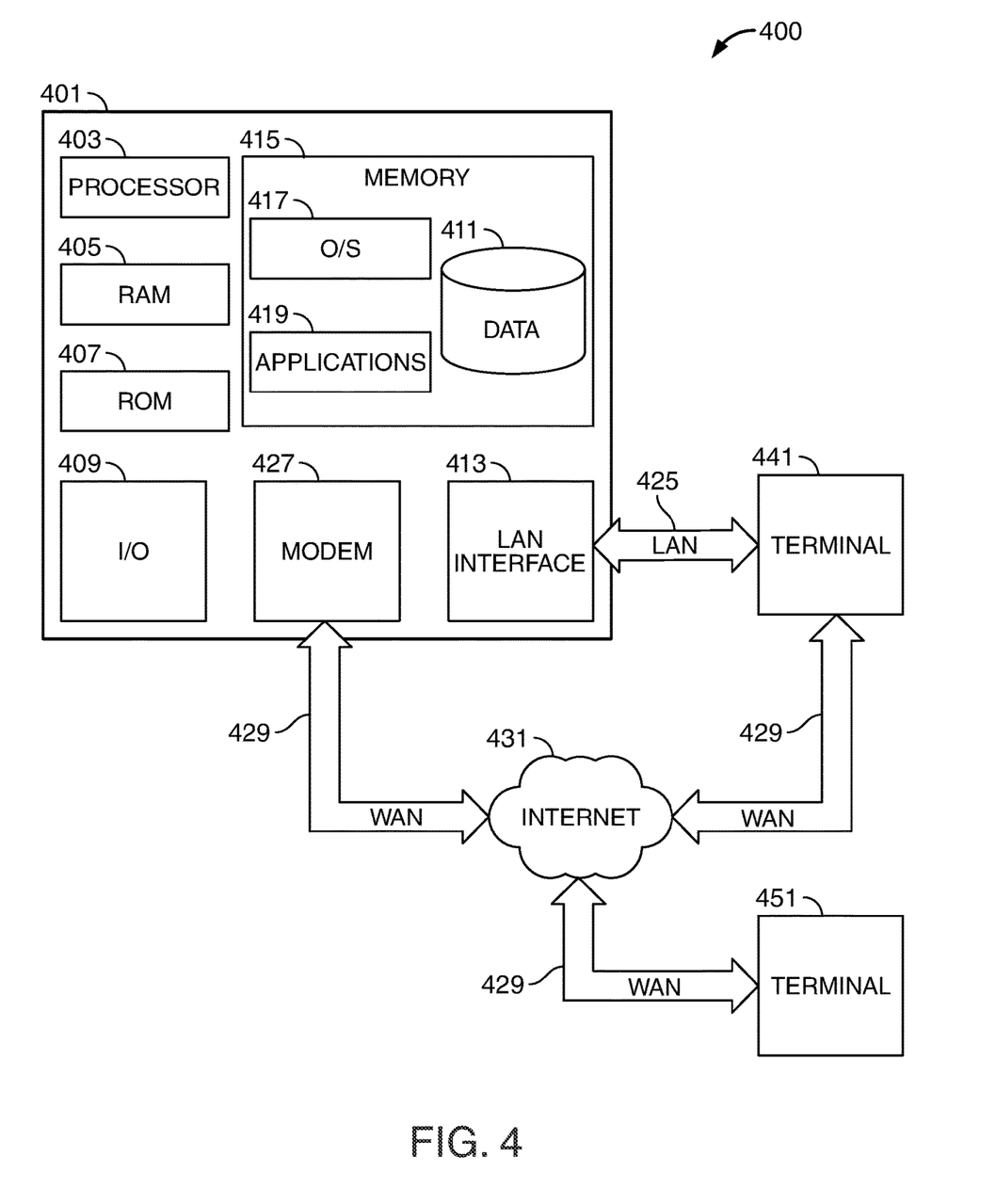
FIG. 4 shows an illustrative block diagram of apparatus in accordance with the invention.

FIG. 4 shows an illustrative block diagram of system 400 that includes computer 401. Computer 401 may alternatively be referred to herein as an "engine," "server" or a "computing device." Computer 401 may be a workstation, desktop, laptop, tablet, smart phone, or any other suitable computing device. Elements of system 400, including computer 401, may be used to implement various aspects of the systems and methods disclosed herein. Each of the apparatus illustrated in FIG. 1, including first website 111, entity central server 109, web beacon 115, password generation application 125, mobile phone 103 and/or second website 105 may include some or all of the elements and apparatus of system 400.

Computer 401 may have a processor 403 for controlling the operation of the device and its associated components, and may include RAM 405, ROM 407, input/output circuit 409, and a non-transitory or non-volatile memory 415. Machine-readable memory may be configured to store information in machine-readable data structures. The processor 403 may also execute all software running on the computer—e.g., the operating system and/or voice recognition software. Other components commonly used for computers, such as EEPROM or Flash memory or any other suitable components, may also be part of the computer 401.

The memory 415 may be comprised of any suitable permanent storage technology—e.g., a hard drive. The memory 415 may store software including the operating system 417 and application(s) 419 along with any data 411 needed for the operation of computer 401. Memory 415 may also store videos, text, and/or audio assistance files. The data stored in Memory 415 may also be stored in cache memory, or any other suitable memory.

Input/output ("I/O") module 409 may include connectivity to a microphone, keyboard, touch screen, mouse, and/or stylus through which input may be provided into computer 401. The input may include input relating to cursor movement. The input/output module may also include one or more speakers for providing audio output and a video display device for providing textual, audio, audiovisual, and/or graphical output. The input and output may be related to computer application functionality.

Computer 401 may be connected to other systems via a local area network (LAN) interface 413. Computer 401 may operate in a networked environment supporting connections to one or more remote computers, such as terminals 441 and 451. Terminals 441 and 451 may be personal computers or servers that include many or all of the elements described above relative to computer 401. The network connections depicted in FIG. 4 include a local area network (LAN) 425 and a wide area network (WAN) 429, but may also include other networks. When used in a LAN networking environment, computer 401 is connected to LAN 425 through a LAN interface 413 or an adapter. When used in a WAN networking environment, computer 401 may include a modem 427 or other means for establishing communications over WAN 429, such as Internet 431. Connections between Computer 401 and Terminals 451 and/or 441 may be used for connections between first website 111 and entity central server 109, password generation application 113 and entity central server 109, web beacon 1115 and entity central server 109, and any other connections described herein.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 419, which may be used by computer 401, may include computer executable instructions for invoking functionality related to communication, such as e-mail, Short Message Service (SMS), and voice input and speech recognition applications. Application program(s) 419 (which may be alternatively referred to herein as "plugins," "applications," or "apps") may include computer executable instructions for invoking functionality related to performing various tasks. Application programs 419 may utilize one or more algorithms that process received executable instructions, perform power management routines or other suitable tasks. Application programs 419 may utilize one or more decisioning processes such as decisioning processes to authenticate the user to the second website as described herein.

Application program(s) 419 may include computer executable instructions (alternatively referred to as "programs"). The computer executable instructions may be embodied in hardware or firmware (not shown). The computer 401 may execute the instructions embodied by the application program(s) 419 to perform various functions.

Application program(s) 419 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 411, and any other suitable information, may be stored in memory 415. One or more of applications 419 may include one or more algorithms that may be used to implement features of the disclosure such as the generating and authenticating of passwords described herein.

The invention may be described in the context of computer-executable instructions, such as applications 419, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 401 and/or terminals 441 and 451 may also include various other components, such as a battery, speaker, and/or antennas (not shown). Components of computer system 401 may be linked by a system bus, wirelessly or by other suitable interconnections. Components of computer system 401 may be present on one or more circuit boards. In some embodiments, the components may be integrated into a single chip. The chip may be silicon-based.

Terminal 451 and/or terminal 441 may be portable devices such as a laptop, cell phone, Blackberry™, tablet, smartphone, or any other computing system for receiving, storing, transmitting and/or displaying relevant information. Terminal 451 and/or terminal 441 may be one or more user devices, such as an XR-enabled headset. Terminals 451 and 441 may be identical to computer 401 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like. Some or more of the computing system environments or configurations may generate three-dimensional images using XR such as holographic images.

Figure 5:
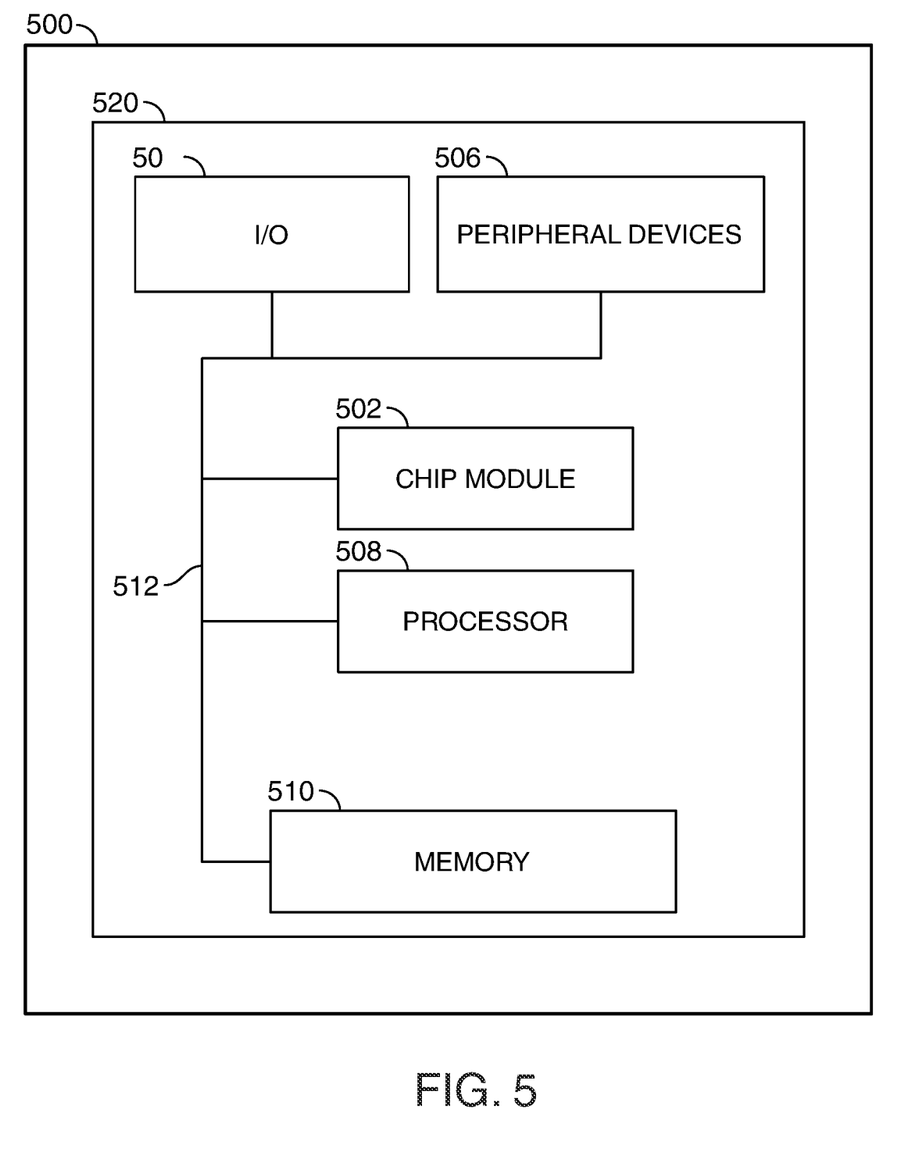
FIG. 5 shows illustrative apparatus that may be configured in accordance with the invention.

FIG. 5 shows illustrative apparatus 500 that may be configured in accordance with the principles of the disclosure. Apparatus 500 may be a computing device. Apparatus 500 may include one or more features of the apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device or any other suitable media or devices; peripheral devices 506, which may include counter timers, real-time timers, power-on reset generators or any other suitable peripheral devices; logical processing device 508, which may compute data structural information and structural parameters of the data; and machine-readable memory 510.

Machine-readable memory 510 may be configured to store in machine-readable data structures: machine executable instructions, (which may be alternatively referred to herein as "computer instructions" or "computer code"), applications such as applications 419, signals, and/or any other suitable information or data structures.

Components 502, 504, 506, 508 and 510 may be coupled together by a system bus or other interconnections 512 and may be present on one or more circuit boards such as circuit board 520. In some embodiments, the components may be integrated into a single chip. The chip may be silicon-based.

Thus, systems and methods for multi-platform authentication are provided. Persons skilled in the art will appreciate that the present invention can be practiced by other than the described embodiments, which are presented for purposes of illustration rather than of limitation.

What is claimed is:

1. A method for automatically authenticating a user at a second website after authenticating the user at a first website, the method comprising:
  receiving user login credentials at the first website;
  using a validation engine running on the first website, validating the user login credentials and granting the user access to the first website;
  after the validating, triggering a web beacon to scan each website accessed by the user to determine if the website is a login page;
  in response to the web beacon determining that a second website accessed by the user is a login page, the web beacon transmitting a URL of the second website to a password generation application;
  the password generation application determining if the URL is included in a permission ledger;
  in response to a determination that the permission ledger does not include the URL, the password generation application taking no action;
  in response to a determination that the permission ledger includes the URL, the password generation application:
    executing a first step to authenticate the password generation application to the second website, the first step including inputting a first username into a first username input field and a first password into a first password input field, wherein the first username input field and the first password input field are displayed on the second website; and
    in response to the second website displaying a second username input field and a second password input field, executing a second step to authenticate the user to the second website, the second step including inputting a second username into the second username input field and a second password into the second password input field, the second username and the second password identifying the user; and
  in response to receiving a logout instruction from the user on the first website, deactivating the web beacon.

2. The method of claim 1 wherein a processor running on a cloud-based server supporting the first website triggers the web beacon after the validating.

3. The method of claim 1 wherein the triggering of the web beacon is performed after receipt of instructions from the user on the first website to trigger the web beacon.

4. The method of claim 1 wherein the web beacon runs an optical character recognition ("OCR") application and an image recognition application to determine if the website is a login page.

5. The method of claim 4 wherein the OCR application searches each website to identify predetermined text including the words 'username' and 'password' and the image recognition application searches each website to identify input fields positioned proximal to the predetermined text.

6. The method of claim 1 wherein, prior to the transmitting of the URL to the password generation application, the web beacon generates a pop-up box asking the user if he wants to log into the second website, the pop-up box including a first selectable option that, when selected, triggers the web beacon to transmit the URL to the password generation application and a second selectable option that, when selected, prompts the web beacon to take no further action.

7. The method of claim 1 wherein the second username and the second password are input by the user into the first website and are stored on the first website.

8. The method of claim 1 wherein the first username and the first password authenticate the password generation application to the second website.

9. The method of claim 1 wherein the first username and the first password are stored by the password generation application and are used by the password generation application to authenticate the password generation application to a plurality of websites.

10. The method of claim 1 wherein the second username and the second password are stored in a database accessible by the first website, are obtained by the password generation application by an API request transmitted from the password generation application to the first website, and are associated with user data.

11. The method of claim 1 wherein the first website, the web beacon and the password generation application run on a cloud-based server supported by an entity.

* * * * *